United States Patent [19]

Nagano et al.

[11] 4,102,215
[45] Jul. 25, 1978

[54] MULTI-SPEED FREEWHEEL FOR A BICYCLE

[75] Inventors: Masashi Nagano; Koya Sonoi, both of Sakai, Japan

[73] Assignee: Shimano Industrial Company Limited, Osaka, Japan

[21] Appl. No.: 795,886

[22] Filed: May 11, 1977

[30] Foreign Application Priority Data

May 19, 1976 [JP] Japan .............................. 51-64690[U]
May 19, 1976 [JP] Japan .............................. 51-64691[U]

[51] Int. Cl.² ...................... F16H 55/30; F16H 9/00; F16H 11/08
[52] U.S. Cl. ............................ 74/243 DR; 74/217 B
[58] Field of Search .......... 74/243 DR, 243 R, 243 C, 74/243 CS, 217 B, 226; 192/6 A, 64; 280/289

[56] References Cited

U.S. PATENT DOCUMENTS

| 1,634,646 | 7/1927 | Bens | 74/243 R |
|---|---|---|---|
| 2,525,516 | 10/1950 | Bergman et al. | 74/243 DR |
| 2,714,820 | 8/1955 | Chamberlain | 74/243 R |
| 2,787,483 | 4/1957 | Harvey et al. | 74/243 |
| 2,841,454 | 7/1958 | Cheramie | 74/243 R |
| 3,213,703 | 10/1965 | Fitzgerald | 74/243 R |
| 3,942,615 | 3/1976 | Craig | 74/217 B |

FOREIGN PATENT DOCUMENTS

| 317,171 | 8/1929 | United Kingdom. | |
| 610,124 | 10/1948 | United Kingdom | 74/243 R |

Primary Examiner—Samuel Scott
Assistant Examiner—W. R. Henderson
Attorney, Agent, or Firm—Stevens, Davis, Miller & Mosher

[57] ABSTRACT

A multi-speed freewheel for a bicycle, whose outer assembly is formed in a cylindrical shape and a plurality of sprockets to be attached to the outer assembly are previously integrated into a sprocket-block so that the sprocket-block may be detachably mounted on the outer periphery of the outer assembly.

15 Claims, 13 Drawing Figures

MULTI-SPEED FREEWHEEL FOR A BICYCLE

This invention relates to a multi-speed freewheel mounted to a hub of a bicycle.

Conventionally, this kind of multi-speed freewheel is composed of a cylindrical inner member fixed to the bicycle hub, an outer assembly unidirectionally rotatable with respect to the inner member through a unidirectional transmission, and a plurality of sprockets attached to the outer periphery of the outer assembly at regularly spaced intervals.

Figure 13:
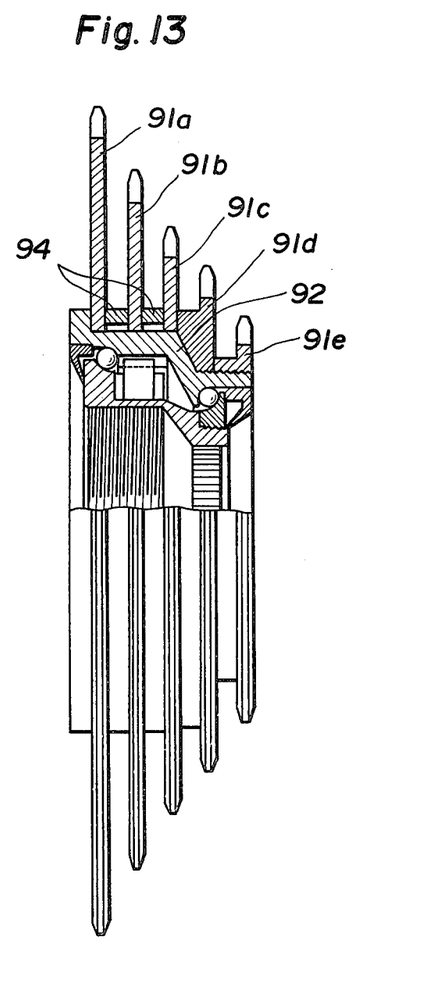
FIG. 13 is a partially longitudinal sectional view showing a conventional freewheel.

The foregoing construction, however, has the sprockets fixed to the outer assembly. In other words, a five speed freewheel having five sprockets 91a to 91e as shown in FIG. 13, is constructed in such a manner that the outer assembly 92 is formed in a stepped cylindrical shape with the middle and low speed sprockets 91a, 91b and 91c being provided at their inner surfaces with splines so as to be secured onto the larger diameter portion of the outer assembly 92 through washers 94 inserted between each sprocket. High speed sprockets 91d and 91e are threaded at their inner surface respectively so as to be screwably supported to the threaded outer surface of the smaller diameter portion of the outer assembly 92, where the high speed sprockets are mechanically tightly screwed to the outer assembly thereby securing each sprocket integrally with the outer member.

Hence, once secured to the outer assembly, the sprockets are very hard to be removed therefrom.

The multi-speed freewheel constructed as described is mounted to the bicycle hub after the sprockets have been attached to the outer assembly. Hence, when an attempt is made to mount the spokes to the hub flange for building the bicycle wheel after the multi-speed freewheel is mounted to the hub, the low speed sprocket having a larger number of teeth tends to obstruct a smooth assembly of spokes.

The spokes being assembled completely prior to screwing the freewheel onto the hub is not problematical in the multi-speed freewheel separate from the hub because there remains a serious problem in the unit hub once the multi-speed freewheel is assembled with the bicycle hub.

There is the problem that when the conventional multi-speed freewheel is to be exchanged as a result of a damaged sprocket because of broken teeth or when it is necessary to change one sized sprocket for a sprocket of a different size the exchange is difficult.

Furthermore, the middle and low speed sprockets 91a, 91b and 91c are, as shown in FIG. 13, different in their inner diameters and inner surface formations from the high speed sprockets 91d and 91e because the sprockets are to be fitted to different locations on the stepped and differently formed outer periphery of the outer assembly 92. Thus there occurs the problem in that the sprockets have limited interchangeability.

In detail, the middle and low speed sprockets are larger in inner diameter and provided with splines at the inner surfaces, while, the high speed sprockets are smaller and provided with screw threads. Hence, it is impossible for all of the sprockets to be positioned interchangeably for example, the middle speed sprockets cannot be positioned where the high speed sprocket was once mounted.

The invention has been designed in view of the aforesaid problems. A main object of the invention is to provide a multi-speed freewheel capable of easily incorporating or removing the sprockets with or from the outer assembly, thereby solving the aforesaid conventional problems. Another object of the invention is to provide a multi-speed freewheel with readily interchangeable sprockets.

The invention is characterized in that the outer assembly of the multi-speed freewheel is formed in a cylindrical shape and a plurality of sprockets, integrated in a sprocket-block, are detachably mounted to the outer periphery of the outer assembly, so that even when the unit hub is combined with the multi-speed freewheel prior to spoke assembly, the wheel spokes can be easily assembled. Further the sprockets are readily replaced when damaged or readily interchangeble to sprockets of different teeth number when it is desired to change the speed change ratio.

These and other objects of the invention will become more apparent in the following description of examples in accordance with the accompanying drawings, in which.

Figures 1, 2:
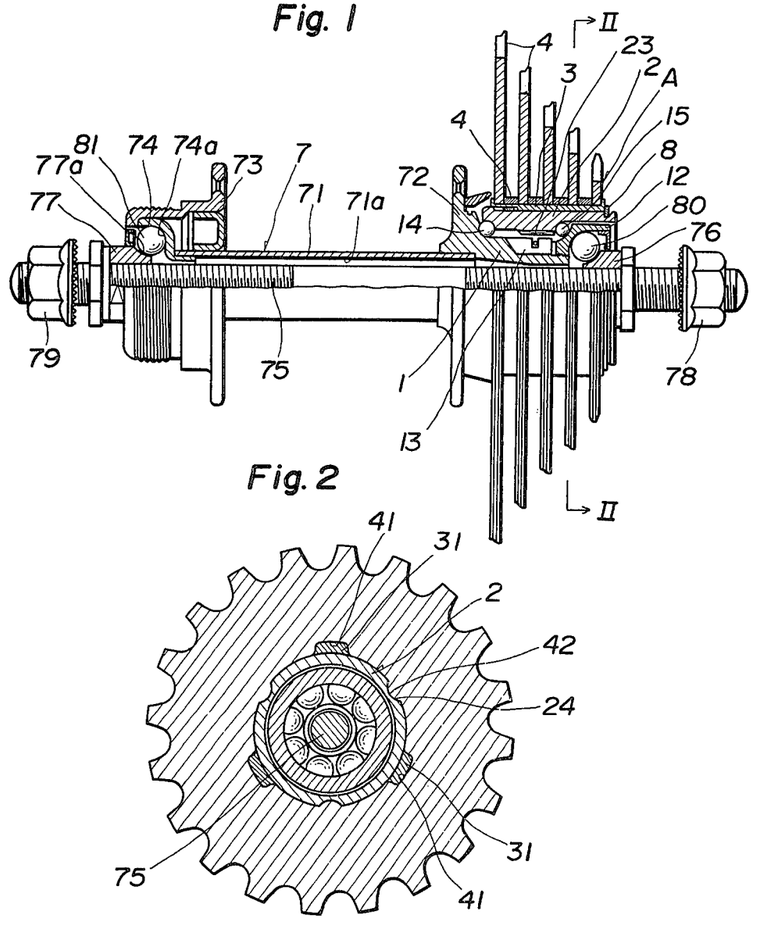
FIG. 1 is a partially cutaway rear elevation view of the unit hub incorporating the multi-speed freewheel of the invention.
FIG. 2 is a sectional view of the unit hub with a sprocket taken along line II—II of FIG. 1.

The unit hub in which the multi-speed freewheel is incorporated with the rear hub of the bicycle is shown in FIG. 1, however, the invention is not limited to the construction applied to the unit hub only, but also is applicable to the freewheel formed separately from the rear hub when screwed thereon.

The multi-speed freewheel of the invention is composed mainly of a cylindrical inner member 1, a cylindrical outer assembly 2 sleeved onto the outer periphery of the inner member 1 and rotatably supported thereon, a unidirectional transmission for transmitting to the inner member 1 the unidirectional rotation of the outer assembly and a sprocket-block A comprising a plurality of sprockets.

The inner member 1 shown in FIG. 1 is formed of a cylindrical portion extending axially outwardly of the rear hub 7 from the right side flange 72 (in the figure) thereof and is integral with the rear hub. At the outer most periphery of the extension is formed a screw thread onto which is screwed a ball holder 12. At the root portion of the extension is formed a ball race 11a, while at the intermediate portion are provided pawls 13 forming part of the unidirectional transmission and swingable radially outwardly from the outer periphery of the intermediate portion through spring means. Rather than be integral with the hub the inner member 1 may be formed separately from the rear hub and thereafter screwed to the rear hub.

Figure 4:
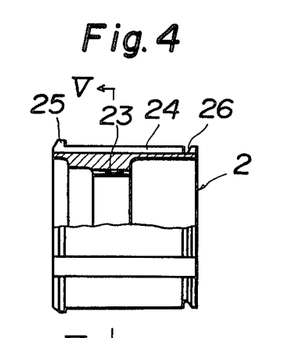
FIG. 4 is a longitudinal view of the outer assembly partially sectioned.
Figure 5:
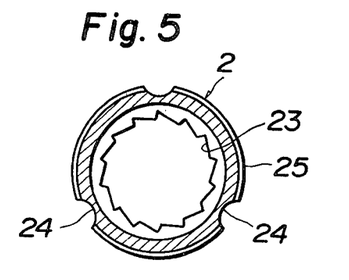
FIG. 5 is a sectional view of the outer assembly taken along line V—V of FIG. 4.

The outer assembly 2, which is rotatably supported on the inner member 1 and the ball holder 12 through balls 14 and 15 respectively, is provided at the inner surface with ball races 21 and 22, opposite to the ball race 11a of the inner member 1 and the ball race 12a of the ball holder 12, and with ratchet teeth 23 in mesh with the pawls 13 to form therewith the unidirectional transmission. At the outer periphery of the outer assembly 2 are provided a plurality of grooves 24 which grooves are each in the form of a circular arc section, extended axially of the outer assembly from one end to the other thereof, and arranged circumferentially at regularly spaced intervals as shown in FIGS. 4 and 5. The outer assembly 2 have at an axial one end of its outer periphery a radially extending annular projection 25 and at the other end an annular groove 26.

The sprocket-block A, which is the most important element of the invention, will be detailed in the following description.

Figures 6, 7, 8, 9:
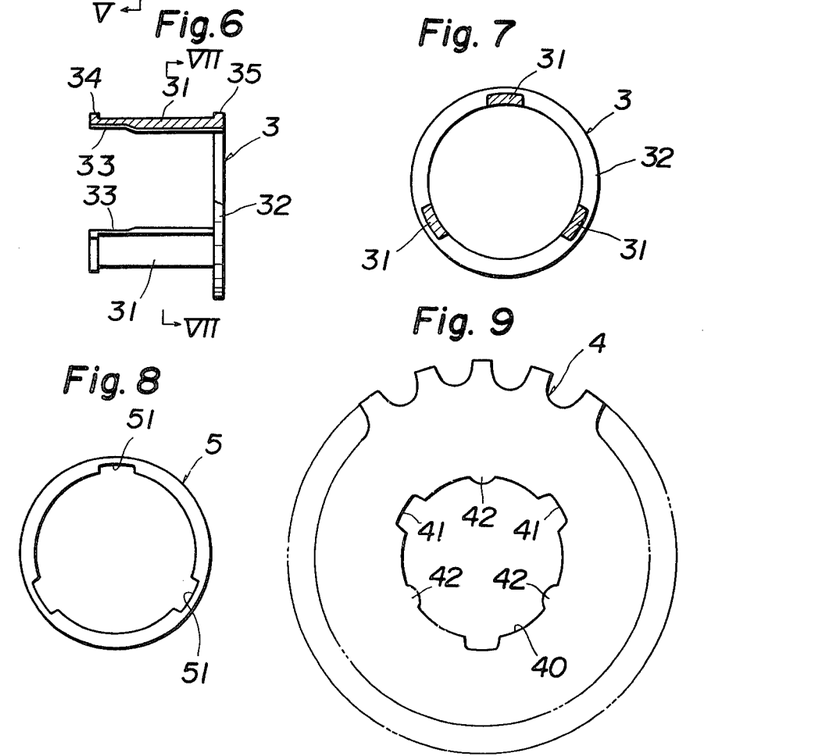
FIG. 6 is a longitudinal view of a retainer partially sectioned.
FIG. 7 is a sectional view of the retainer taken along line VII—VII of FIG. 6.
FIG. 8 is a side view of a washer.
FIG. 9 is a side view of a sprocket.

The sprocket-block A comprises a plurality of sprockets 4 cooperating with each other and aligned at regularly spaced intervals. The typical sprocket-block employs a retainer 3 as shown in FIGS. 6 and 7 or bolts 6 shown in FIG. 12 for integrally connecting the sprockets, which will be described hereinafter. The invention, however, is not limited to such an example.

Figure 3:
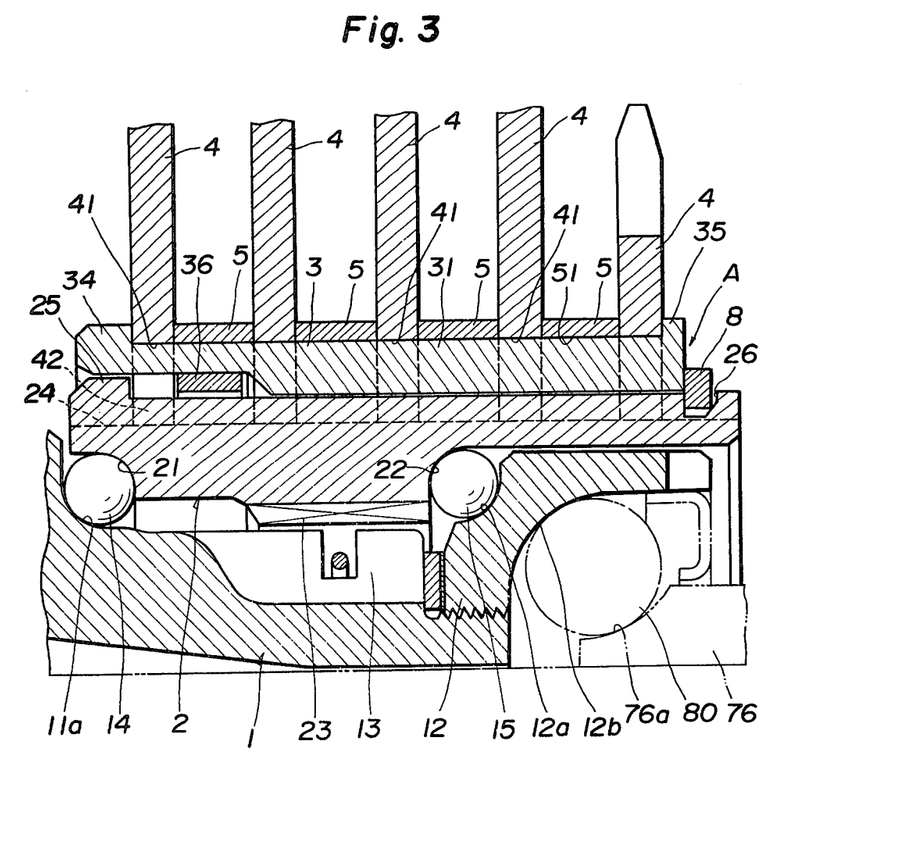
FIG. 3 is a partially omitted enlarged longitudinal sectional view of the multi-speed freewheel of the invention.

First, referring to FIGS. 1 to 9, the embodiment employing the FIG. 3 will be described hereafter.

The retainer 3, which is sleeved onto the outer assembly 2, as shown in FIGS. 6 and 7, is composed of a plurality of support strips 31 and an annular connector 32. Each of the support strips 31 is connected at one end to the connector 32, extends axially of the outer assembly 2, and has at the other free end a recess 33 formed at the inner surface thereof and a projection 34 at the outer surface. The annular connector 32 has its inner diameter just fitting over the outer periphery of the outer assembly 2 and an annular projection 35 directed outwardly of the outer periphery of the connector 32.

The sprockets 4 carried by the retainer 3, as shown in FI. 9, have each center hole 40 of a diameter larger than the outer diameter of the outer assembly 2. Each of the center holes has at its inner surface a plurality of grooves 41 engageable with the support strips 31 of the retainer 3 and a plurality of projections 42 engageable with each of the grooves 24 respectively, circumferentially formed at regularly spaced intervals. The sprockets 4 are regularly spaced by means of cylindrical washers 5 whose inner surfaces are large enough to just fit over the outer periphery of the outer assembly 2 and have a plurality of grooves 51 engageable with the support strips 31 of the retainer 3.

In the construction as aforesaid, the sprocket-block A is built in such a manner that the sprockets 4 and washers 5 are alternately inserted onto the outer surface of each of the support strips 31 through its free end by being deflected radially inwardly so as not to interfere with the insertion by the projections 34 and, so that the grooves 41 of the sprockets 4 and the grooves 51 of the washers 5, are insertably engaged with the supports strips 31 for preventing the sprockets and washers from being rotatable circumferentially back and forth. Each of the washers 5 keeps each of the sprockets regularly spaced, and the projection 34 at the free ends of supports 31 and the annular projection 35 of the retainer 3, keep the sprockets 4 rigid so as not to move axially back and forth. A C-like shaped ring 36 of spring steel is inserted into the recess 33 of each of the support strips 31 so as to expand the strips radially outwardly of the retainer 3, thereby forcing contact of the sprockets 4 with the retainer 3 to form the sprocket-block A.

In place of the separate washers 5, the sprockets 4 may be regularly spaced by flange-like spacers integral with the sprockets.

Also, for preventing the sprockets 4 from being axially moved, separately formed lock pins may be mounted in place of the projections 34 at the support strips 31 of the retainer 3. In this instance, there is no need for the support strips 31 to be deflected for insertably supporting the sprockets so that the support strips 31 become larger in thickness to result in no need for the ring spring 36.

Figure 10:
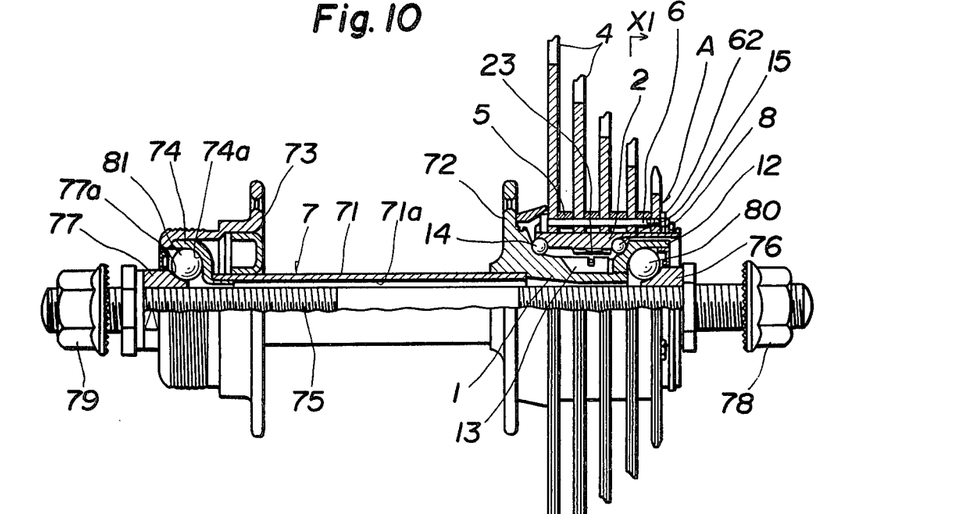
FIG. 10 is a partially cutaway rear elevation view of a further embodiment of the unit hub assembled with the multi-speed freewheel of the invention.
Figure 11:
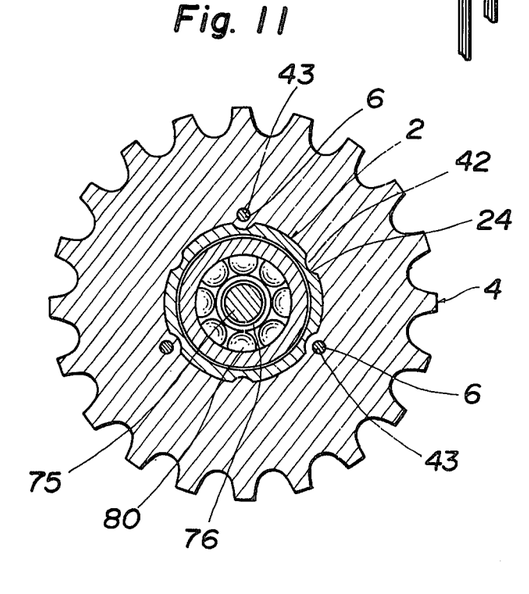
FIG. 11 is a sectional view of the unit hub with a sprocket taken along line XI—XI of FIG. 10.
Figure 12:
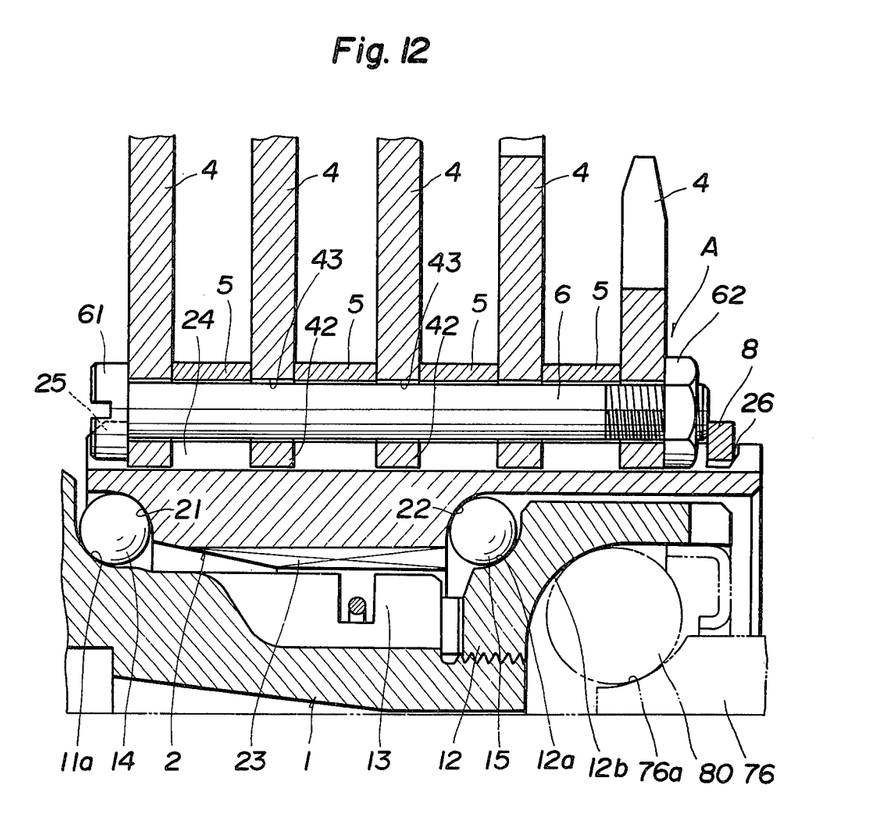
FIG. 12 is a partially omitted enlarged longitudinal sectional view of the embodiment of FIG. 10.

Second, the embodiment employing bolts 6 as shown in FIGS. 10 to 12 will be detailed in the following description.

The bolts 6 are headed at 61 and of a given length. The sprockets 4 to be integrally connected by the bolts 6 are provided with the same center holes 40 as in the former embodiment employing the retainer. At the inner surface of each of the center holes 40 are provided a plurality of projections 42 in engagement with the grooves 24 respectively, and at the portions adjacent to the hole 40 are formed through holes 43, corresponding to the projections 42.

The headed bolts 6 of each length larger than the sum of each sprocket thickness and washer width are inserted through the holes 43 and screwably tightened at the bolt ends by nuts 62 so that the sprockets 4 may be integrated at regularly spaced intervals by the washers 5, thus forming the sprocket-block A.

Alternatively, the holes 43 of the outermost sprocket 4 may be threaded to be screwed to the bolt ends in place of the aforesaid nuts 62. The nuts then become useless. Also, a flange-like spacer formed integrally with each of the sprockets 4 may be used in place of the washer as in former embodiment.

The sprocket-block A formed as described is assembled with the outer assembly 2 to complete the multi-speed freewheel of the invention by slipping the sprocket-block A onto the outer periphery of the outer assembly 2 so that the projections 42 of each of the sprockets 4 engage with the grooves 24 of the outer assembly 2 so as to prevent the sprocket-block A from circumferentilly moving. The outside end face of the outermost sprocket, the leftmost one in the figure, is abutted against the annular projection 25 at one end of the outer assembly 2, and thereafter a snap ring 8 is inserted into the annular groove 26 at the other end to prevent the sprocket-block A from axially coming off from the outer assembly, thereby detachably mounting the sprocket-block A to the outer assembly 2.

For preventing the sprocket-block A from axially escaping from the outer assembly 2, any method other than the snap ring may be utilized. For transmitting the driving force from the sprockets 4 to the outer assembly 2, the grooves 24 of the outer assembly may instead be projections and the projections 42 of each of the sprockets 4 may in turn be grooves engageable with the projections respectively. Other than the aforesaid engagement of the projections 42 of the sprocket 4 with the grooves 24 of the outer assembly 2, these projections and grooves may also be provided between the outer assembly 2 and the retainer 3 for the sprocket-block A or between the outer assembly 2 and the washers 5.

Although, the embodiments as shown and described employ five sprockets, two sprockets are sufficient to form a sprocket-block.

In addition, referring to FIGS. 1 to 10, the reference numeral 71 designates a hub shell with an axle hole 71a. At both axial ends of the hub shell 71 are provided the right side flange 72 and the left side flange 73 opposite thereto. At the right side of flange 72 the inner member 1 is integrally formed therewith. The inner member 1 is screwed at its outermost end to the ball holder 12 having the inner ball race 12b, and leftwardly of the left side flange 73 is provided a ball holder 74 having at its inner surface a ball race 74a. A shaft 75 is inserted into the axle hole 71a of the hub shell 71 and is screwed at both axial ends with cones 76 and 77, having ball races 76a and 77a, opposite to the ball races 12b and 74a of the ball holders 12 and 74 respectively. The shaft 75 is fixed to the bicycle frame (not shown) through nuts 78 and 79 screwed onto both ends of the shaft outside of the cones 76 and 77 respectively. Also, the hub shell 71 and the inner member 1 are rotatably supported with respect to the shaft 75 through balls 80 and 81 inserted between each ball race of the ball holders 12 and 74 and the cones 76 and 77.

As fully understood from the abovementioned description, the invention is directed to integrate a plurality of sprockets displaced at regularly spaced intervals so as to form a sprocket-block detachably mounted to the outer assembly. Hence, the sprocket-block can be removed from the hub when spokes are mounted to the rear hub for the so-called spoke assembly, so that the multi-speed freewheel of the invention is applicable for use with the unit hub in which the multi-speed freewheel previously was incorporated with the rear hub. The spoke assemblying becomes uncomplicated when no hindrance is caused by the larger diameter sprockets. Furthermore, even when the sprocket-block is replaced by a new one or sprockets exchanged for a different size in order to change the speed change ratio, the sprockets are changeable extremely simply and easily to result in remarkably improved working efficiency in comparison with the conventional multi-speed freewheel.

In other words, each of the sprockets can be assembled with or removed from the outer member without any particular tool, thereby considerably improving the working efficiency.

Furthermore, each of the sprockets can be of equal inner diameter so that the sprockets can be interchanged thereby changing the speed change stage and the transmission ratio with no change of the outer assembly.

While preferred embodiments of the invention have been described using specific terms, such description is for illustrative purpose only, and it is to be understood that changes and variations may be made without departing from the spirit or scope of the following claims.

What is claimed is:

1. A multi-speed freewheel mounted to a hub of a bicycle, said multi-speed freewheel comprising,
   a. a cylindrical inner member fixed to said hub,
   b. a cylindrical outer assembly having inner and outer peripheries, said assembly being mountable onto an outer periphery of said inner member so as to be rotatably supported with respect to said inner member,
   said outer assembly having on its outer periphery spaced configurations directed axially of said outer assembly,
   c. a unidirectional transmission provided between the outer periphery of said inner member and the inner periphery of said outer assembly,
   said transmission serving to transmit unidirectional rotation from said outer assembly to said inner member,
   d. a sprocket-block having an inner periphery mountably engageable with the outer periphery of said outer assembly,
   said sprocket-block comprising a plurality of sprockets each having a center hole of a diameter larger than that of the outer periphery of said outer assembly, said sprockets being aligned at regularly spaced intervals longitudinally of said outer assembly, the surface of each sprocket defining said hole having spaced configurations thereon engageable with the configurations of said outer assembly, and
   e. means for fixing said sprocket-block to said outer assembly after said sprocket-block is mountably engaged thereon.

2. The multi-speed freewheel according to claim 1, wherein a plurality of said sprockets have holes therethrough and including bolts extending through each of said holes to integrally connect said sprockets, thereby forming said sprocket-block.

3. The multi-speed freewheel according to claim 2, wherein said through holes are provided adjacent to said center hole of each of a plurality of said sprockets.

4. The multi-speed freewheel according to claim 1, including a retainer, which retainer integrates said sprockets, thereby forming said sprocket-block.

5. The multi-speed freewheel according to claim 4, including a holding means for said sprockets and wherein said retainer comprises a plurality of support strips extending axially of said outer assembly and an annular connector for connecting each of said support strips at one end thereof, said sprockets further defining at each center hole a plurality of engaging grooves insertably engageable with said supports strips to align said sprockets, said sprockets being integrated by said holding means.

6. The multi-speed freewheel according to claim 5, wherein said holding means is a C-like shaped ring.

7. The multi-speed freewheel according to claim 5, wherein said support strips of the retainer are made radially elastically deflectable and each of said strips is provided at both ends with projections, said projections extending radially outward of said retainer and being engageable with each outermost lateral side of the assembled sprockets, said sprockets being supported between both said projections at regularly spaced intervals, said holding means being a C-like shaped ring inserted into the inside of each of said support strips, thereby integrally holding said sprockets by said retainer.

8. The multi-speed freewheel according to claim 1, wherein said fixing means for fixing said sprocket-block to said outer assembly is constituted to make said sprocket-block detachable with respect to said outer member.

9. The multi-speed freewheel according to claim 8, wherein said fixing means is a snap ring.

10. The multi-speed freewheel according to claim 1, wherein each of the spaced configurations on the outer periphery of said outer assembly is a groove and each of the spaced configurations on the inner periphery of said sprocket-block is a projection.

11. The multi-speed freewheel according to claim 1, wherein each of the spaced configurations on the outer periphery of said outer assembly is a projection and each of the spaced configurations on the inner periphery of the center hole of said sprocket-block is a groove.

12. The multi-speed freewheel according to claim 1, wherein the spaced configurations on said sprocket-block are provided on the inner periphery of the center hole of each of said sprockets.

13. The multi-speed freewheel according to claim 4, wherein the spaced configurations on said sprocket-block are provided on said retainer.

14. The multi-speed freewheel according to claim 1, wherein the sprockets at said sprocket-block are kept regularly spaced by means of washers, each of said washers having the spaced configurations provided thereon.

15. The multi-speed freewheel according claim 1, wherein said inner member is integrated with said hub.

* * * * *